United States Patent [19]

Park

[11] Patent Number: 5,959,977
[45] Date of Patent: Sep. 28, 1999

[54] APPARATUS FOR EMBODYING COMBINED TIME SWITCHING AND CONFERENCE CALLING FUNCTIONS

[75] Inventor: Jae-Min Park, Seoul, Rep. of Korea

[73] Assignee: SamSung Electronics Co., Ltd., Suwon, Rep. of Korea

[21] Appl. No.: 08/761,887

[22] Filed: Dec. 9, 1996

[30] Foreign Application Priority Data

Dec. 8, 1995 [KR]  Rep. of Korea ...................... 95/47942

[51] Int. Cl.$^6$ ........................... H04L 12/16; H04Q 11/00
[52] U.S. Cl. ............................................ 370/263; 379/201
[58] Field of Search .................................... 370/261, 262, 370/263, 442, 264, 266, 269, 271, 360, 374; 379/201, 202

[56] References Cited

U.S. PATENT DOCUMENTS

| Re. 34,305 | 7/1993 | Sakurai . | |
|---|---|---|---|
| 4,157,458 | 6/1979 | Roche . | |
| 4,481,624 | 11/1984 | Baranyai . | |
| 4,627,046 | 12/1986 | Bellamy . | |
| 4,639,909 | 1/1987 | Nirschl . | |
| 4,809,261 | 2/1989 | Ratcliff . | |
| 4,819,226 | 4/1989 | Beckner . | |
| 4,841,522 | 6/1989 | Yamazaki . | |
| 4,858,227 | 8/1989 | Ratchliff . | |
| 4,862,452 | 8/1989 | Milton . | |
| 4,888,765 | 12/1989 | Dyke . | |
| 4,970,718 | 11/1990 | Simcoe . | |
| 5,007,049 | 4/1991 | Ohtsuka | 370/269 |
| 5,123,012 | 6/1992 | Suzuki . | |
| 5,329,579 | 7/1994 | Brunson | 379/201 |
| 5,452,298 | 9/1995 | Takamatsu | 379/202 |
| 5,511,071 | 4/1996 | Gloess | 379/202 |

Primary Examiner—Huy D. Vu
Assistant Examiner—Chiho Andrew Lee
Attorney, Agent, or Firm—Robert E. Bushnell, Esq.

[57] ABSTRACT

An apparatus for embodying integrated time switching and conference calling functions in a private exchange system, comprising a first converter for converting serial mode channel data from a plurality of incoming highways into parallel mode channel data, and for multiplexing the parallel mode channel data in time division to form multiplexed data in time slots within a frame. A data memory having a plurality of memory locations is connected to the first converter to store the multiplexed data in groups of said time slots received from the first converter during a write operation, and to supply stored multiplexed data in groups of the time slots during a read operation. An address counter generates a write address during the write operation for storing the multiplexed data in groups of the time slots in the data memory. A control memory stores control information to read and select stored multiplexed data during the read operation. A controller controls at least one of the write operation and the read operation through an interface unit connected between the data memory and the control memory. A conference calling unit is coupled to receive the stored multiplexed data in groups of the time slots from the data memory to establish conference connections during respective time slots. And a second converter is connected ot the conference calling unit to demultiplex an output of the conference calling unit to form parallel output data, and to convert the parallel output data into serial output data to a plurality of outgoing highways.

37 Claims, 6 Drawing Sheets

APPARATUS FOR EMBODYING COMBINED TIME SWITCHING AND CONFERENCE CALLING FUNCTIONS

CLAIM FOR PRIORITY UNDER 35 U.S.C. §119

This application makes reference to, incorporates the same herein, and claims all benefits accruing under 35 U.S.C. §119 from an application for Apparatus For Embodying Combined Time Switching And Conference Calling Functions earlier filed in the Korean Industrial Property Office on Dec. 8, 1995 and there duly assigned Serial No. 49742/1995.

BACKGROUND OF THE INVENTION

1. Technical Field

The present invention relates to a private exchange system, and more particularly, to an integrated time switching and conference calling apparatus for performing time switching and conference calling functions.

2. Background Art

Private branch exchange (PBX) systems are well known for providing switched communications between a plurality of PBX subscriber telephones, computers, etc. The switched communications take place through a switching matrix where the actual signal interconnects between the PBX signal ports and at which the subscriber equipments such as telephones and computers are connected. In modern digital PBX systems, the signal information such as voice and data is typically in a byte wide, pulse code modulated (PCM) format, and the switching matrix is a time slot interchange (TSI) which time division multiplexes the PCM sample bytes between ports. Exemplars of contemporary practice in typical time division switching systems are disclosed in U.S. Pat. No. 4,430,733 for Switching Of Digital Signals issued to Hardy et al., U.S. Pat. No. 4,564,936 for Time Division Switching Network issued to Takahashi, U.S. Pat. No. 4,809,261 for Space And Time Switch For 22 PCM Highways issued to Radcliff, U.S. Pat. No. 4,841,522 for Time Division Channel Switching Circuit issued to Yamazaki, U.S. Pat. No. 4,858,227 for Space And Time Having Multiplexed Memories issued to Ratcliff, and U.S. Pat. No. 5,123,012 for Time Division Switching Apparatus issued to Suzuki et al.

Conference service may be included in the digital PBX systems to establish conference connections between subscribers with or without restriction as to the number of subscribers that may participate in a conference session. Conventional PBX systems which contain conference calling functions are disclosed, for example, in U.S. Pat. No. 4,119,807 for Digital Time Division Multiplexed Switching System issued to Nahay, U.S. Pat. No. 4,481,624 for Linear Time Division Multiplexed Conferencer issued to Baranyai et al., U.S. Pat. No. 4,509,166 for PCM Communication System And Method Of Operation issued to Simon, and U.S. Pat. No. 4,521,879 for Digital Private Branch Exchange issued to Gueldenpfennig et al. Generally, a conference calling unit is included in the digital PBX system to make available a range of conference sizes. In the contemporary conference service available in the digital PBX system, however, a central processing unit (CPU) is required to control time switching and conference calling functions separately via an interface circuit. Moreover, I have found that the incoming highways which are important factors for determining a number of allowed subscribers using the conference service are not allocated to the subscribers but are used only as system resources i.e., conference calling function.

SUMMARY OF THE INVENTION

Accordingly, it is an object of the present invention to provide an apparatus for effectively and efficiently combining time switching and conference calling functions.

It is another object of the present invention to provide a private branch exchange system capable of handling both time switching and conference calling functions.

These and other objects of the present invention can be achieved by an apparatus for combining both time switching and conference calling functions in a private exchange system, comprising a first converter for converting serial mode channel data from a plurality of incoming highways into parallel mode channel data, and for multiplexing the parallel mode channel data in time division to form multiplexed data in time slots within a frame. A data memory having a plurality of memory locations is connected to the first converter to store the multiplexed data in groups of said time slots received from the first converter during a write operation, and to supply stored multiplexed data in groups of the time slots during a read operation. An address counter generates a write address during the write operation for storing the multiplexed data in groups of the time slots in the data memory. A control memory stores control information to read and select stored multiplexed data during the read operation. A controller controls at least one of the write operation and the read operation through an interface unit connected between the data memory and the control memory. A conference calling unit is coupled to receive the stored multiplexed data in groups of the time slots from the data memory to establishing conference connections during respective time slots. A second converter is connected to the conference calling unit to demultiplex an output of the conference calling unit to form parallel output data, and to convert the parallel output data into serial output data to a plurality of outgoing highways.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
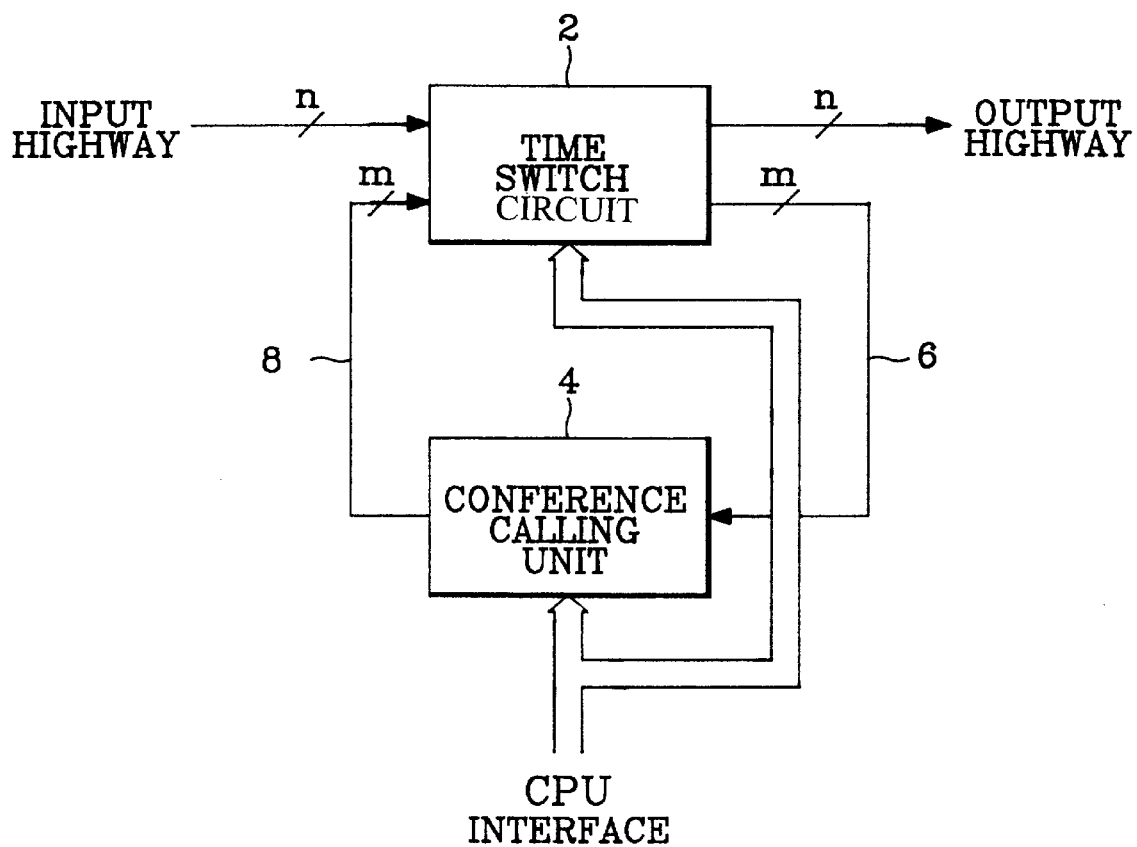
FIG. 1 is an abstract representation of a conventional PBX system for embodying combined time switching and conference calling functions.

Refer now to the drawings and particularly to FIG. 1, which is an abstract representation of a conventional PBX system for embodying combined time switching and conference calling functions. As shown in FIG. 1, the PBX system includes a time switch circuit 2 and a conference calling unit 4 separately connected to interchange data between a plurality of input highways and a plurality of output highways. M+N input highways are connected to input/output ports of the time switch circuit 2. M input highways are separately connected to the conference calling unit 4. A central processing unit (CPU) controls operation of the time switch circuit 2 via a CPU interface to thereby supply input channels corresponding to a conference calling group among the M input highways 8 of the time switch circuit 2 and the M input highways 6 of the conference calling unit 4.

The conference calling unit 4 performs the digital conference operation with respect to the input channels from the M input highways 6. The conference calling function is performed for each conference calling group set by the CPU interface. The channels, where the operation of the conference calling function is applied, are directed to the time switch 2 via the input highway 8 of the time switch circuit 2. The time switch circuit 2 performs the time switching operation to thereby output the corresponding channel data to the final output highway.

In the contemporary conference service available in the digital PBX system as shown, for example, in FIG. 1, however, the CPU is required to control time switching and conference calling functions separately via an interface circuit. Moreover, I have found that the incoming highways which are important factors for determining a number of allowed subscribers using the conference service are not allocated to the subscribers but are used only as system resources i.e., conference calling function.

Figure 2:
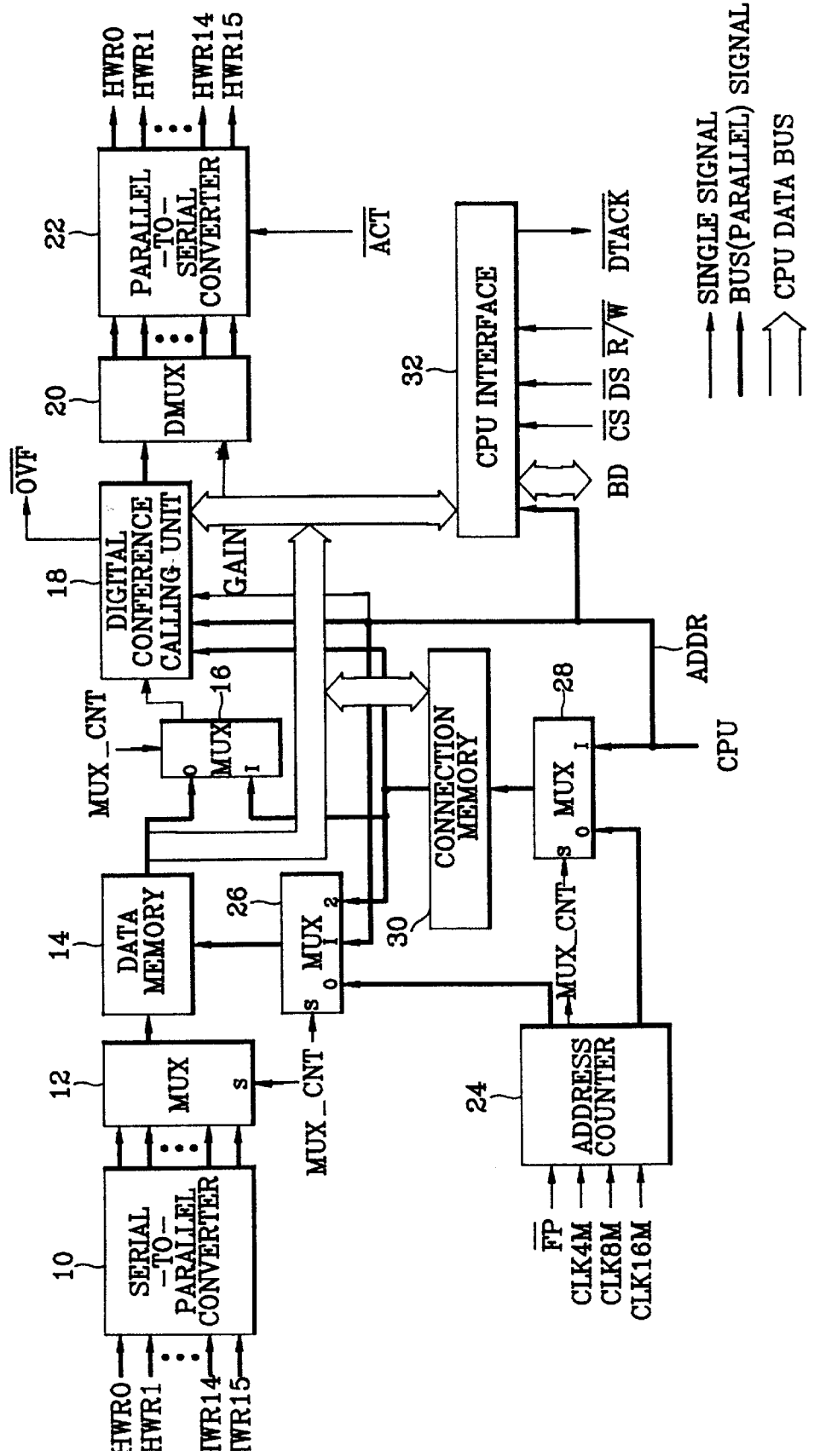
FIG. 2 is a block diagram illustrating an apparatus for embodying combined time switching and conference calling functions constructed according to the principles of the present invention.

Turn now to FIG. 2 which illustrates an apparatus for embodying combined time switching and conference calling functions constructed according to the principles of the present invention. A digital conference calling unit 18 which digitally allows the data processing of a conference call is included within a time switching circuit and is controlled by the CPU through a CPU interface 32. The time switching circuit is represented by all the circuit components as shown in FIG. 2 except for a multiplexer 16 and a digital conference calling unit 18.

As shown in FIG. 2, the apparatus includes a serial-to-parallel converter 10, a first multiplexer 12, a data memory 14, a second multiplexer 16, a digital conference calling unit 18, a demultiplexer 20, a parallel-to-serial converter 22, an address counter 24, third and fourth multiplexers 26 and 28, a connection memory 30, and a CPU interface 32 which allows the CPU to control operation of both the time switching function and the conference calling function. Further referring to FIG. 2, sixteen input highways HWR0 to HWR15 are connected to the serial-to-parallel converter 10 for conversion of input PCM serial data of the respective channels for these sixteen highways to output parallel data. The serial-to-parallel converter 10 includes sixteen shift registers and sixteen eight-bit latches to convert the serial data of the respective channel into time slot of one byte. The parallel data output from the serial-to-parallel converter 10 is applied to the multiplexer 12. The multiplexer 12 sequentially transmits the time slots converted for the respective highways to the data memory 14 in response to a signal MUX_CNT output from an address counter 24. The address counter 24 receives a frame pulse $\overline{FP}$ and various clock signals CLK4M, CLK8M and CLK16M to perform the counting operation, and applies the MUX_CNT signal to each select terminal of the first to four multiplexer 12, 16, 26 and 28 for controlling operation of the first to fourth multiplexers 12, 16, 26 and 28. The address counter 24 also periodically generates read addresses to an input terminal 0 of the multiplexer 28 and generates write addresses corresponding to sequential write operations per a time slot duration to an input terminal 0 of the multiplexer 26.

Data memory 14 sequentially stores the time slots output from the multiplexer 12 in response to selection of the input terminal 0 by the multiplexer 12. At this time, the write addresses are applied to the data memory 14 via the multiplexer 26, are generated from the address counter 24 according to time slot numbers TS0 ... TS511 on the respective input highways HWR0 ... HWR15 for each channel. For this reason, the data memory 14 is preferably composed of 512-byte RAM (8×512).

The operation of the data memory 14 includes a sequence of write operation per each time slot duration, random read operation and read operation by the CPU in a read message mode. For this reason, the multiplexer 26 is preferably composed of a 3-input multiplexer. The sequential write address per time slot duration comes from the address counter 24, and the random read address comes from the connection control word of the connection memory 30. Also, the address of the CPU read operation comes directly from the CPU. The connection memory 30 has a connection control word port (a 16-bit port) for receiving a serial stream of connection control words each corresponding to each channel one by one. For this reason, the connection memory 30 is preferably composed of a 512 word RAM.

Figure 6:
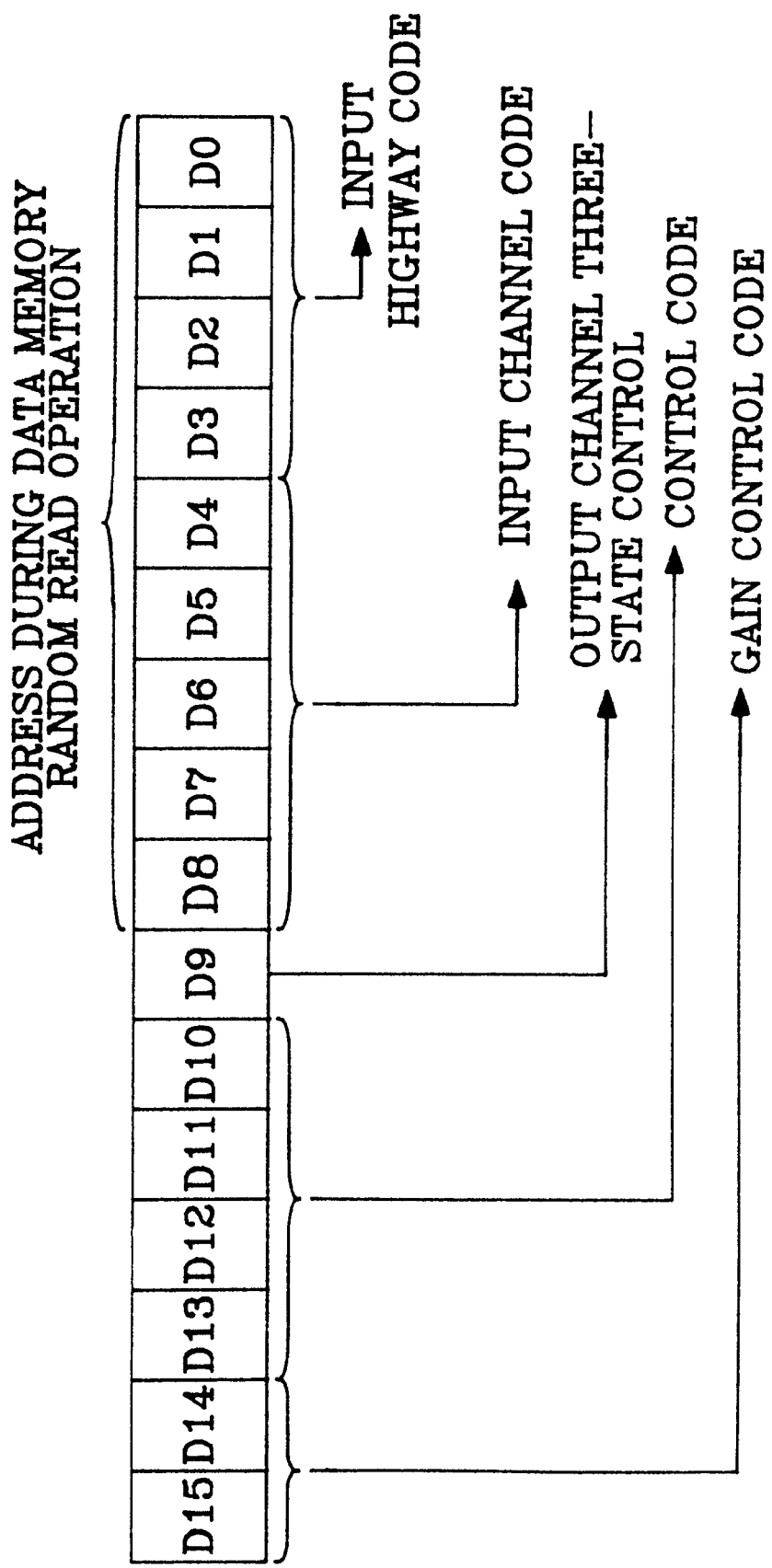
FIG. 6 illustrates a bit map of a connection control word.

FIG. 6 illustrates a bit map of each connection control word comprising sixteen (16) data bits D0~D15 in which D0~D3 represent input highway code bits, D4~D8 represent input channel code bits, D9 represents an output channel 3-state control code bit, D10~D13 represent control code bits and D14~D15 represent gain control code bits. Referring to FIG. 6, input highway code bits composed of D0~D3 and input channel code bits D4~D8, i.e., 9 lower bits D0~D8 are supplied to addresses for the random read operation of the data memory 14. And the read channel data goes to the corresponding output channels, so that time switching operation may be performed.

The output channel 3-state control bit D9 controls 3-states of the corresponding output highway channel. The control code segment composed of D10~D13 assigns the conference calling group ID to which the corresponding channel belongs upon the conference call mode and assigns a general call mode and a write message mode. The gain control code segment composed of D14 and D15 as the gain control code bits for the respective channel is applied to the digital conference calling unit 18.

The write message operation is selected by the second input multiplexer 16 of FIG. 2. During the write message mode, the lower bits D0~D7 of the connection control word of the connection memory 30 are selected thus to embody the write message mode. During a switching mode, a time slot byte of the data memory 14 is selected thus to embody the switching mode.

In the meanwhile, access of the connection memory 30 is divided into read/write of the CPU and sequential read operation by the address counter 24 positioned at an interior thereof. The access is selected by the multiplexer 28, and the selected address is applied to the connection memory 30.

The CPU interface 32 generates internal block enable signals from the input upper address bits of the CPU, the internal blocks including the connection memory 30, the digital conference calling unit 18, or the data memory 14 and etc, and it also generates a data transfer acknowledge signal (DTACK) for synchronous bus operation. Also, the CPU interface 32 selects various internal source data during the CPU read operation, to thereby output the selected data to the CPU data bus. As signals applied to the CPU interface 32, there are a chip selection signal CS, a data strobe signal DS and a read/write signal R/W. A signal BD is denoted as a bi-directional data bus.

The digital conference calling unit 18 for embodying calls among multiple participants receives time slot data output from the data memory 14, via the multiplexer 16 the conference calling group ID, D13~D10 in the control code bits of the connection control word of the connection memory 30 corresponding to attributes of the time slot, i.e., states of D15~D10, and the gain control code bits, D15 and D14, thereby performing digital summation and subtraction.

In the explanation on the operation to be explained hereinbelow, the conference calling groups ID, D13~D10 is designated as CONF_GRP and the gain control code bits, D15 and D14 are designated as GAIN.

Figure 4:
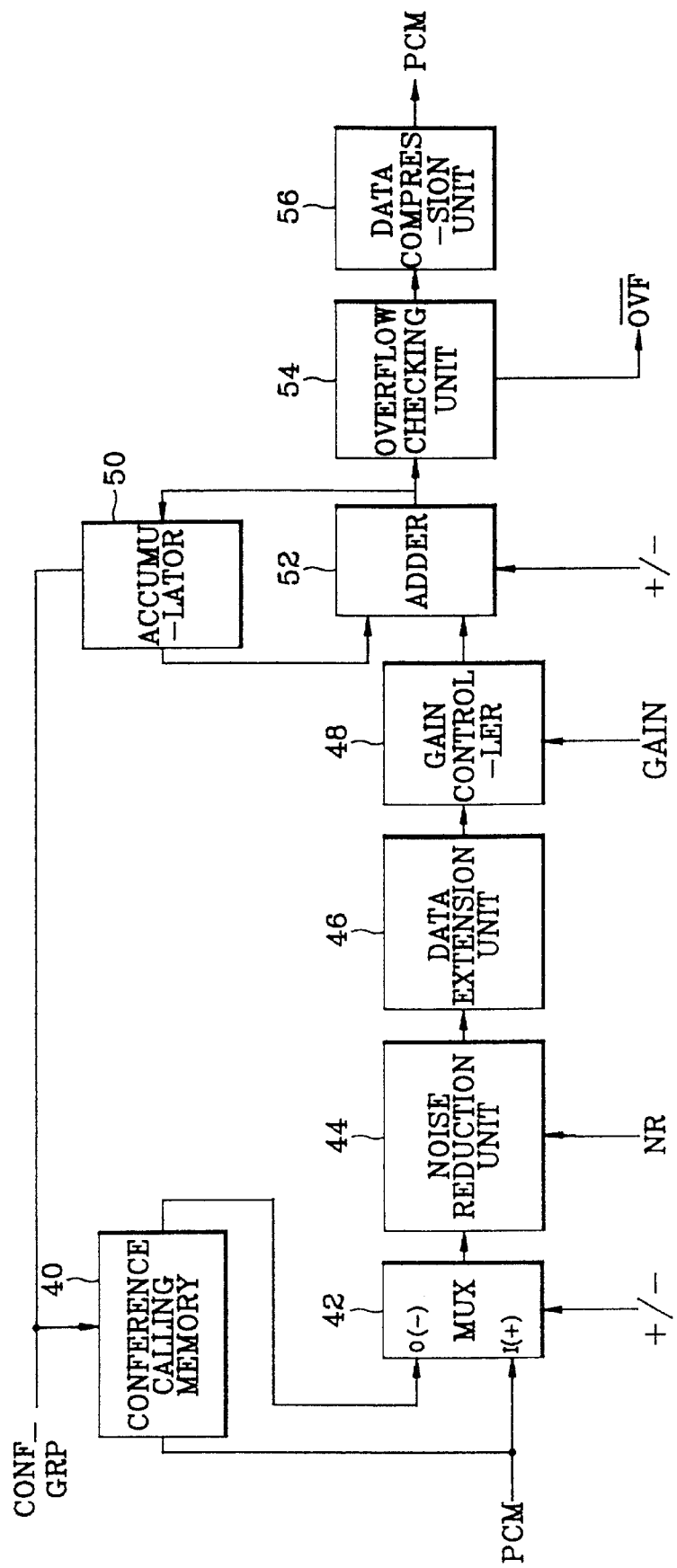
FIG. 4 is a detailed block diagram illustrating the construction of a digital conference calling unit as shown in FIG. 2.

FIG. 4 is a detailed block diagram of the digital conference calling unit 18, which includes a conference calling memory 40, a multiplexer 42, a noise reduction unit 44, a data extension unit 46, a gain controller 48, an accumulator 50, an adder 52, an overflow checking unit 54 and a data compression unit 56.

Regarding FIG. 4, if the conference calling group ID CONF_GRP and the gain control code bit GAIN are not applied which means a general calling state, the corresponding signal PCM is output via the multiplexer 42, the noise reduction unit 44, the data extension unit 46, the gain controller 48, the adder 52, the overflow checking unit 54 and the data compression unit 56. However, if the conference calling group ID CONF_GRP and the gain control code bit GAIN are applied, the following operation occurs.

Before explaining the conference calling operation with reference to FIG. 4, three time slots of nth frame are defined as a[n], b[n] and c[n], respectively, and it is assumed that these time slots belong to the conference calling group X. Then, the ACC_X[N-1]=a[n-1]+b[n-1]+c[n-1] will currently be stored in the accumulator 50. Here, ACC_X[N-1] means that the summation of the previous signals of the conference calling group X is stored in the accumulator 50.

In such a state, the operation of nth frame will now be described hereinafter. The digital conference calling unit 18 performs both subtraction mode and summation mode within a time slot.

First, the operation for the subtraction mode will be explained as follows. If a time slot a[n] is input, while passing through the multiplexer 42, and a subsequent series of processing blocks, i.e., the noise reduction unit 44, the data extension unit 46 and the gain controller 48, and finally through the adder 52, the slot a[n-1] stored in the conference calling memory 40 becomes a←ACC_X[n-1]−LIN(a[n-1]). Here, LIN refers to a function of the data extension unit 46, and LIN(a[n-1]) is a value obtained when the slot a[n-1] is processed via the series of processing blocks following after the multiplexer 44. Thus, in the subtraction mode, the adder 52 performs the subtraction with respect to the value ACC_X[n-1] of the accumulator 50 and the processed value LIN(a[n-1]). Therefore, letter "a" represents the value obtained by excluding the participant's own voice from three participants' voices, which allows only the voices of the others to be heard during the conference call.

Next, the summation mode will be explained in the following. Immediately after the subtraction mode is performed, the summation mode is performed. At this time, nth frame ACC_X[n] should be obtained for the next (n+1)th subtraction mode.

Therefore, among PCM data, a[n], b[n] and c[n] are stored in the conference calling memory 40 in the imput sequence as well as perform a predetermined processing operation via the multiplexer 42, the noise reduction unit 44, the data extension unit 46 and the gain controller 48, and the performed values are added in the adder 52 to then be stored in the accumulator 50. The stored value is such that ACC_X[n]←LIN(a[n])+LIN(b[n])+LIN(c[n]).

Referring again to FIG. 4, the operations of processed blocks will be described in detail hereinbelow. The noise reduction unit 44 operates in response to a noise reduction code NR from a conference call controlling register for each group. So then, if the PCM value corresponding to the noise defined in the noise reduction code NR is input, PCM is produced as 0. For example, if NR=11, the 16th PCM values of the first segment, i.e., 00H~0FH, are all output as 00H. In other words, the noise reduction unit 44 digitally eliminates channel noise of the PCM. The data extension unit 46 extends the PCM data input from the multiplexer 16 according to the compression/extension mode into linear data. The gain controller 18 controls the gain in response to the GAIN signal supplied from the connection control word of the connection memory 30 according as the overflow signal (OVF) is generated in the overflow checking unit 54.

Figure 5:
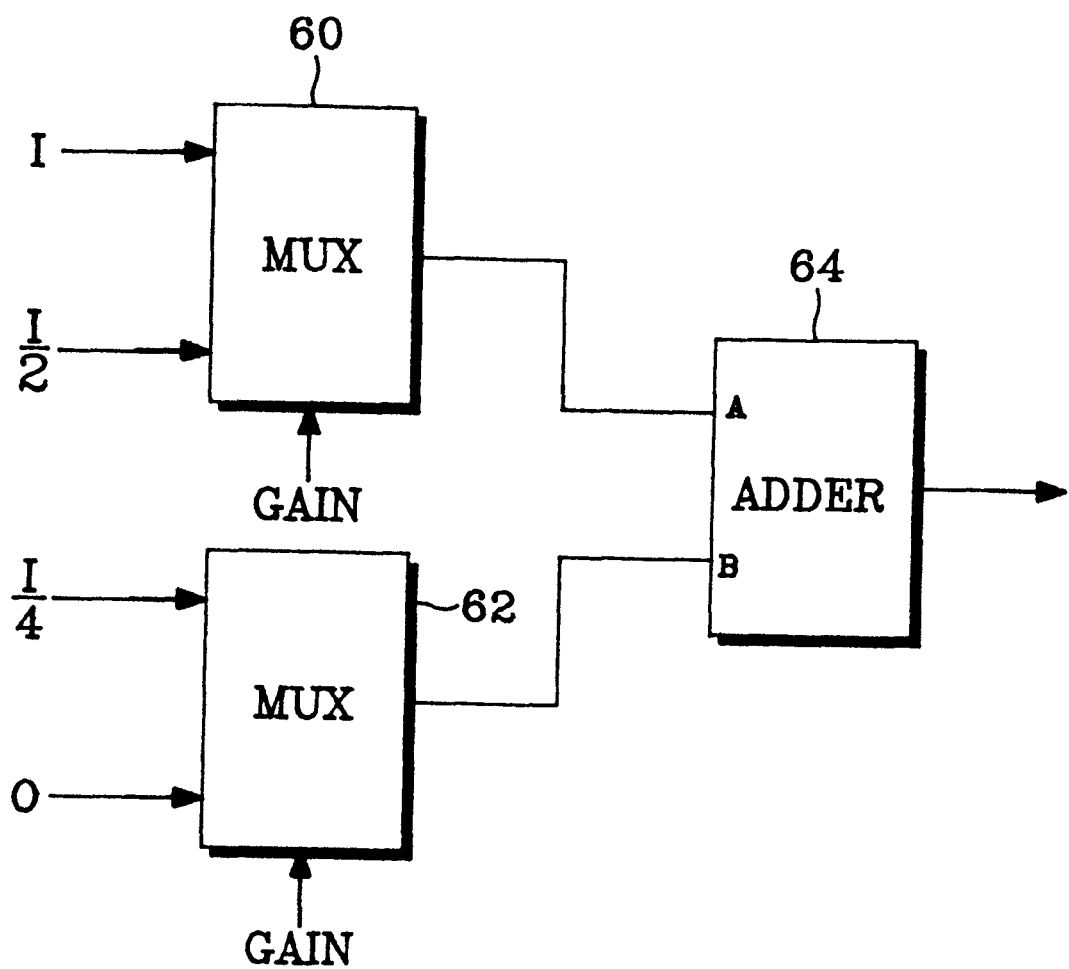
FIG. 5 is a detailed block diagram illustrating the construction of a gain controller as shown in FIG. 4.

FIG. 5 is a detailed block diagram of the gain controller 48. The gain controller 18 composed of two multiplexers 60 and 62 and an adder 64 performs four-steps gain control. Inputs/outputs A and B of the adder 64 according to the respective GAIN signals are as follows.

0 dB: A+B=I+0=I

−3 dB: A+B=½·I+¼·I=¾·I

−6 dB: A+B=½·I+0=½·I 3 dB: A+B=I+¼·I=⁵⁄₄·I

As can be seen hereinabove, "a" obtained in the adder 52 during the conference call, i.e., voices of the others except a speaker's voice, is capable of checking the overflow in the overflow checking unit 54. The overflow is checked when the voices of several people are combined to produce a predetermined value which cannot be processed. If the overflow is generated, the overflow checking unit 54 supplies the overflow signal (OVF) to the CPU via the CPU interface 32. Accordingly, the CPU applies the gain control code among the connection control words of the connection memory 30 as an appropriate value. As described above, since the signal overflow-checked in the overflow checking unit 54 is compressed into the PCM data in the data compression unit 56, the operation of the digital conference calling unit 18 is completed. The PCM signal output from the digital conference calling unit 18, i.e., the time switching conference calling time slot, is then applied to the demultiplexer 20 of FIG. 2.

Referring back to FIG. 2, the demultiplexer 20 demultiplexes the signal output from the digital conference calling unit 18 to be output as parallel data. The parallel-to-serial converter 22 converts the parallel data output from the demultiplexer 20 into serial data to be applied to the output highway.

Figure 3:
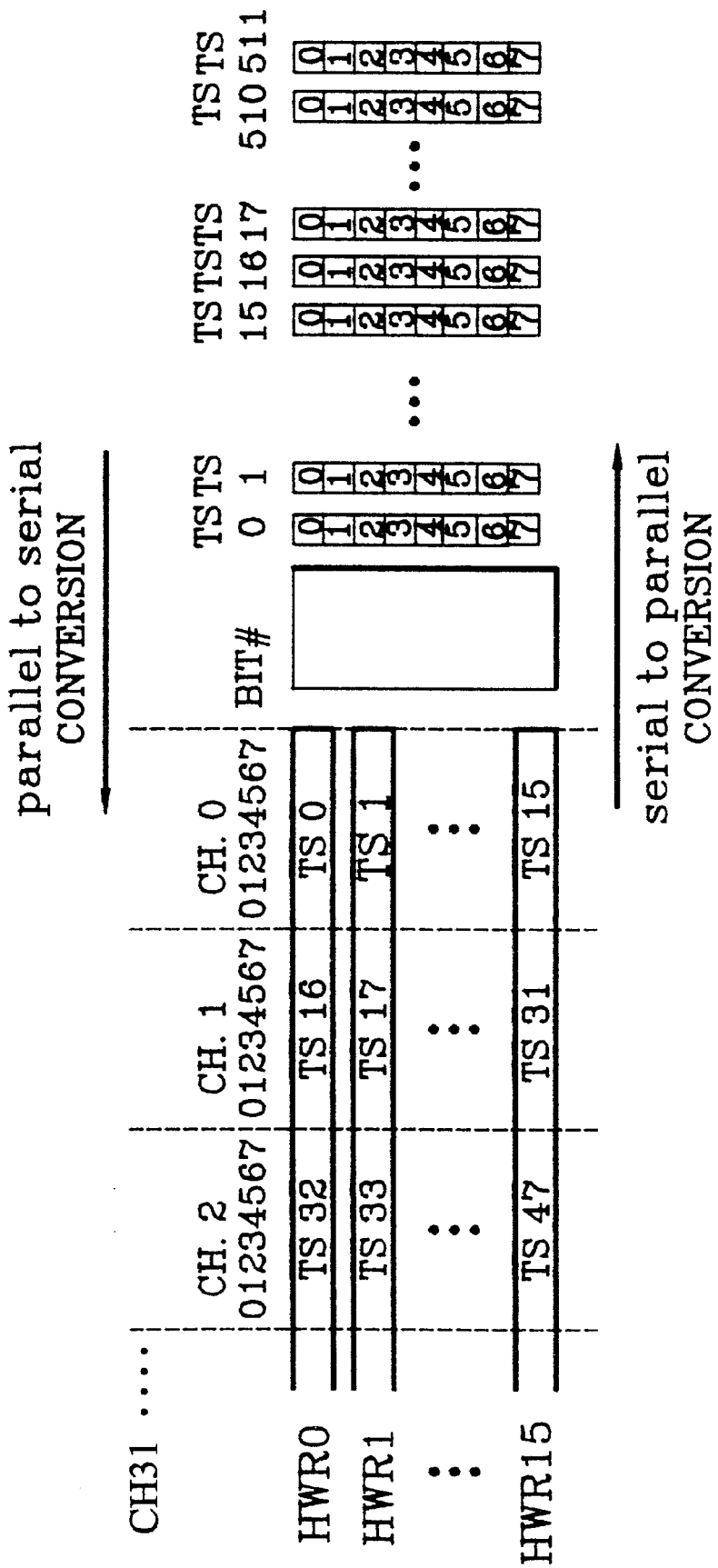
FIG. 3 illustrates a time slot serial-to-parallel conversion and a parallel-to-serial conversion according to the principles of the present invention.

An example of a time slot serial-to-parallel conversion and a parallel-to-serial conversion according to the principles of the present invention is illustrated in FIG. 3. As shown in FIG. 2, the serial-to-parallel converter 10 converts a serial form of the input highways HWR0 . . . HWR15 for each channel, for example, channel 0 to channel 2 according to time slot numbers TS0 . . . TS511 into parallel form on internal highways. The parallel-to-serial converter 22 converts a parallel form of time slots back into a serial form for output highways.

As described above, according to the present invention, since time switching and conference calling functions are combined, system resources and cost are considerably reduced. In addition, the time switching and conference call operations are advantageously simplified.

While the invention has been described with reference to a preferred embodiment, it will be understood by those skilled in the art that various changes may be made and that equivalents may be substituted for elements thereof without departing from the true spirit and scope of the invention. In addition, many modification may be made to adapt a particular situation and material to the novel teachings of the invention without departing from the novel teachings of the present invention. Therefore, it is intended that the present invention not be limited to the particular embodiments disclosed as the best mode contemplated for carrying out the present invention, but that the present invention includes all embodiments falling within the scope of the appended claims.

What is claimed is:

1. An apparatus for combining both time switching and conference calling functions in a private exchange system, comprising:

first converter means for converting serial mode channel data from a plurality of incoming highways into parallel mode channel data, and for multiplexing the parallel mode channel data in time division to form multiplexed data in time slots within a frame;

a data memory having a plurality of memory locations for storing the multiplexed data in groups of said time slots received from said first converter means during a write operation, and for supplying stored multiplexed data in groups of said time slots during a read operation;

an address counter for generating a write address during said write operation for storing the multiplexed data in groups of said time slots in said data memory;

a control memory for storing control information to read and select stored multiplexed data during said read operation;

a controller comprising a multiplexer connected between said address counter, said control memory and said data memory for controlling at least one of said write operation and said read operation, wherein said multiplexer multiplexes a write address from said address counter and a read address from said control memory for provision to said data memory;

a conference calling unit coupled to receive the stored multiplexed data in groups of said time slots from said data memory, for establishing conference connections during respective time slots; and second converter means for demultiplexing an output of said conference calling unit to form parallel output data, and for converting the parallel output data into serial output data for provision to a plurality of outgoing highways.

2. The apparatus of claim 1, said control information including:

address bits representing a read address for said read operation;

conference control bits for designating a conference calling group to which a corresponding channel belongs upon establishment of a conference call operation, and for designating a general call operation and said write operation; and gain control bits representing gain control for at least one channel.

3. The apparatus of claim 1, said conference calling unit comprising:

a conference calling memory for respectively storing conference call time slot data in dependence upon conference control bits indicating a conference calling group;

a selector for selecting between conference call time slot data output from said conference call memory and the stored multiplexed data in groups of said time slots from said data memory in response to one of a subtraction mode and a summation mode;

a first data processor for performing noise reduction, data extension, and gain control of an output of said selector in dependence upon gain control bits;

an operator for subtracting one input time slot data processed in said first data processor from a summation of accumulated previous input time slot data upon establishment of said subtraction mode, and for adding input time slot data input one by one and processed in said first data processor upon establishment of said summation mode;

an accumulator for accumulating a summation of said input time slot data for a subsequent subtraction mode; and a second data processor for checking an overflow from a data output from said operator, and for performing data compression.

4. The apparatus of claim 1, said control information including:

address bits representing a read address for said read operation;

conference control bits for designating a conference calling group to which a corresponding channel belongs upon establishment of a conference call mode, and for designating a general call mode and a write message mode; and gain control bits representing gain control for at least one channel.

5. The apparatus of claim 1, said first converter means comprising:

a serial-to-parallel converter, coupled to receive said serial mode channel data from said plurality of incoming highways, for converting said serial mode channel data into said parallel mode channel data; and a multiplexer for multiplexing the parallel mode channel data to form said multiplexed data.

6. The apparatus of claim 5, said serial-to-parallel converter comprising sixteen serial shift registers and sixteen 8-bit latches serially arranged to produce said parallel mode channel data in said time slots.

7. The apparatus of claim 6, wherein said data memory comprises a 512-byte read-only-memory.

8. The apparatus of claim 7, wherein said connection memory comprises a 512-word read-only-memory.

9. The apparatus of claim 1, said second converter means comprising:

a demultiplexer for demultiplexing an output of said conference calling unit to form demultiplexed output data; and a parallel-to-serial converter for converting the demultiplexed output data into the serial output data for provision to said plurality of outgoing highways.

10. The apparatus of claim 1, wherein said data memory comprises a 512-byte read-only-memory.

11. The apparatus of claim 1, wherein said connection memory comprises a 512-word read-only-memory.

12. An apparatus for combining both time switching and conference calling functions in a private exchange system, comprising:

means for multiplexing PCM data in time division to form multiplexed data in time slots within a frame;

a data memory for storing the multiplexed data in groups of said time slots during a write operation, and for supplying stored multiplexed data in groups of said time slots during a read operation;

an address counter for generating a write address during said write operation for storing the multiplexed data in groups of said time slots in said data memory;

a control memory for storing control information to read and select stored multiplexed data during said read operation;

a controller comprising a multiplexer connected between said address counter, said control memory and said data memory for controlling said write operation and said read operation, wherein said multiplexer multiplexes a write address from said address counter and a read address from said control memory for provision to said data memory;

a conference calling unit, coupled to receive the stored multiplexed data in groups of said time slots from said data memory, for establishing conference connections during respective time slots; and means for demultiplexing an output of said conference calling unit to produce output data.

13. The apparatus of claim 12, said control information including:

address bits representing a read address for said read operation;

conference control bits for designating a conference calling group to which a corresponding channel belongs upon establishment of a conference call operation, and for designating a general call operation and said write operation; and gain control bits representing gain control for at least one channel.

14. The apparatus of claim 12, said conference calling unit comprising:

a conference calling memory for respectively storing conference call time slot data in dependence upon conference control bits indicating said conference calling group;

a selector for selecting between conference call time slot data output from said conference call memory and the stored multiplexed data in groups of said time slots from said data memory in response to one of a subtraction mode and a summation mode;

a first data processor for performing noise reduction, data extension, and gain control of an output of said selector in dependence upon gain control bits;

an operator for subtracting one input time slot data processed in said first data processor from a summation of accumulated previous input time slot data upon establishment of said subtraction mode, and for adding input time slot data input one by one and processed in said first data processor upon establishment of said summation mode;

an accumulator for accumulating a summation of said input time slot data for a subsequent subtraction mode; and a second data processor for checking an overflow from a data output from said operator, and for performing data compression.

15. The apparatus of claim 12, said multiplexing means comprising:

a serial-to-parallel converter for receiving said PCM data from a plurality of incoming highways, and for converting said PCM data from serial to parallel PCM data; and a multiplexer for multiplexing the parallel PCM data to form said multiplexed data.

16. The apparatus of claim 15, said serial-to-parallel converter comprising sixteen serial shift registers and sixteen 8-bit latches serially arranged to produce said parallel PCM data in said time slots.

17. The apparatus of claim 16, wherein said data memory comprises a 512-byte read-only-memory.

18. The apparatus of claim 17, wherein said connection memory comprises a 512-word read-only-memory.

19. The apparatus of claim 12, said demultiplexing means comprising:

a demultiplexer for demultiplexing the output of said conference calling unit to form demultiplexed output data; and a parallel-to-serial converter for converting said demultiplexed output data from parallel to serial to form said output data.

20. A private exchange system for establishing a conference connection between a plurality of incoming highways and a plurality of outgoing highways, comprising:

a time switching circuit comprising a data memory for performing channel switching in accordance with sequential write/read operations, an address counter for generating a write address during a write operation, a control memory for storing control information for a read operation, and a multiplexer connected between said address counter, said control memory and said data memory for controlling at least one of said write operation and said read operation, wherein said multiplexer multiplexes a write address from said address counter and a read address from said control memory for provision to said data memory;

a digital conference calling circuit which is connected to said data memory, and which operates in a digital manner for conference calling of a time slot corresponding to a conference calling function from an output of said data memory under the control of said conference calling function; and a central processing unit connected to said time switching circuit and said digital conference calling circuit for combining both said time switching function and said conference calling function and controlling operations of combined time switching and conference calling functions.

21. An apparatus for combining both time switching and conference calling functions in a private exchange system, comprising:

a serial-to-parallel converter for converting PCM data of a plurality of incoming highways, from serial into parallel PCM data;

a multiplexer for multiplexing the parallel PCM data to form multiplexed data in time slots within a frame;

a data memory for storing multiplexed data in groups of said time slots in accordance with a write address during a write operation, and providing stored multiplexed data in groups of said time slots in accordance with a read address during a read operation;

a control memory storing control information for reading and selecting stored multiplexed data during said read operation;

a central processing unit for controlling said write operation and said read operation through an interface unit connected between said data memory and said control memory;

a conference calling unit, coupled to receive the stored multiplexed data in groups of said time slots from said data memory, for establishing conference connections during respective time slots;

a demultiplexer for demultiplexing an output of said conference calling unit to form output data; and a parallel-to-serial converter for converting said output data from parallel into serial for provision to a plurality of outgoing highways.

22. The apparatus of claim 21, said control information comprising address bits representing a read address for said read operation, conference control bits for designating a conference calling group to which a corresponding channel belongs upon a conference call operation and for designating a general call operation and said write operation, and gain control bits representing gain control for at least one channel.

23. The apparatus of claim 21, said conference calling unit comprising:

a conference calling memory for respectively storing conference call time slot data in dependence upon conference control bits indicating a conference calling group;

a selector for selecting between conference call time slot data output from said conference call memory and the stored multiplexed data in groups of said time slots from said data memory in response to one of a subtraction mode and a summation mode;

a first data processor for performing noise reduction, data extension, and gain control of an output of said selector in dependence upon gain control bits;

an operator for subtracting one input time slot data processed in said first data processor from a summation of accumulated previous input time slot data upon establishment of said subtraction mode, and for adding input time slot data input one by one and processed in said first data processor upon establishment of said summation mode;

an accumulator for accumulating a summation of said input time slot data for a subsequent subtraction mode; and a second data processor for checking an overflow from a data output from said operator, and for performing data compression.

24. The apparatus of claim 21, said serial-to-parallel converter comprising sixteen serial shift registers and sixteen 8-bit latches serially arranged to produce said parallel PCM data in said time slots, said data memory corresponding to a 512-byte read-only-memory, and said control memory corresponding to a 512-word read-only-memory.

25. An apparatus for combining both time switching and conference calling functions in a private exchange system, comprising:

first converter means for converting serial mode channel data from a plurality of incoming highways into parallel mode channel data, and for multiplexing the parallel mode channel data in time division to form multiplexed data in time slots within a frame;

a data memory having a plurality of memory locations for storing the multiplexed data in groups of said time slots received from said first converter means during a write operation, and for supplying stored multiplexed data in groups of said time slots during a read operation;

an address counter for generating a write address during said write operation for storing the multiplexed data in groups of said time slots in said data memory;

a control memory for storing control information to read and select stored multiplexed data during said read operation;

a controller for controlling at least one of said write operation and said read operation through an interface unit connected between said data memory and said control memory;

a conference calling unit coupled to receive the stored multiplexed data in groups of said time slots from said data memory, for establishing conference connections during respective time slots; and second converter means for demultiplexing an output of said conference calling unit to form parallel output data, and for converting the parallel output data into serial output data to a plurality of outgoing highways;

said conference calling unit comprising:

a conference calling memory for respectively storing conference call time slot data in dependence upon conference control bits indicating a conference calling group;

a selector for selecting between conference call time slot data output from said conference call memory and the stored multiplexed data in groups of said time slots from said data memory in response to one of a subtraction mode and a summation mode;

a first data processor for performing noise reduction, data extension, and gain control of an output of said selector in dependence upon gain control bits;

an operator for subtracting one input time slot data processed in said first data processor from a summation of accumulated previous input time slot data upon establishment of said subtraction mode, and for adding input time slot data input one by one and processed in said first data processor upon establishment of said summation mode;

an accumulator for accumulating a summation of said input time slot data for a subsequent subtraction mode; and a second data processor for checking an overflow from a data output from said operator, and for performing data compression.

26. The apparatus of claim 25, said control information including:

address bits representing a read address for said read operation;

conference control bits for designating a conference calling group to which a corresponding channel belongs upon establishment of a conference call operation, and for designating a general call operation and said write operation; and gain control bits representing gain control for at least one channel.

27. The apparatus of claim 25, said first converter means comprising:

a serial-to-parallel converter, coupled to receive said serial mode channel data from said plurality of incoming highways, for converting said serial mode channel data into said parallel mode channel data; and a multiplexer for multiplexing the parallel mode channel data to form said multiplexed data.

28. The apparatus of claim 27, said serial-to-parallel converter comprising sixteen serial shift registers and sixteen 8-bit latches serially arranged to produce said parallel mode channel data in said time slots.

29. The apparatus of claim 28, wherein said data memory comprises a 512-byte read-only-memory.

30. The apparatus of claim 29, wherein said connection memory comprises a 512-word read-only-memory.

31. An apparatus for combining both time switching and conference calling functions in a private exchange system, comprising:

means for multiplexing PCM data in time division to form multiplexed data in time slots within a frame;

a data memory for storing the multiplexed data in groups of said time slots during a write operation, and for supplying stored multiplexed data in groups of said time slots during a read operation;

an address counter for generating a write address during said write operation for storing the multiplexed data in groups of said time slots in said data memory;

a control memory for storing control information to read and select stored multiplexed data during said read operation;

a controller for controlling said write operation and said read operation through an interface unit connected between said data memory and said control memory;

a conference calling unit, coupled to receive the stored multiplexed data in groups of said time slots from said data memory, for establishing conference connections during respective time slots; and means for demultiplexing an output of said conference calling unit to produce output data; said conference calling unit comprising:

a conference calling memory for respectively storing conference call time slot data in dependence upon conference control bits indicating said conference calling group;

a selector for selecting between conference call time slot data output from said conference call memory and the stored multiplexed data in groups of said time slots from said data memory in response to one of a subtraction mode and a summation mode;

a first data processor for performing noise reduction, data extension, and gain control of an output of said selector in dependence upon gain control bits;

an operator for subtracting one input time slot data processed in said first data processor from a summation of accumulated previous input time slot data upon establishment of said subtraction mode, and for adding input time slot data input one by one and processed in said first data processor upon establishment of said summation mode;

an accumulator for accumulating a summation of said input time slot data for a subsequent subtraction mode; and a second data processor for checking an overflow from a data output from said operator, and for performing data compression.

32. The apparatus of claim 31, said control information including:

address bits representing a read address for said read operation;

conference control bits for designating a conference calling group to which a corresponding channel belongs upon establishment of a conference call operation, and for designating a general call operation and said write operation; and gain control bits representing gain control for at least one channel.

33. The apparatus of claim 31, said multiplexing means comprising:

a serial-to-parallel converter for receiving said PCM data from a plurality of incoming highways, and for converting said PCM data from serial to parallel PCM data; and a multiplexer for multiplexing the parallel PCM data to form said multiplexed data.

34. The apparatus of claim 33, said serial-to-parallel converter comprising sixteen serial shift registers and sixteen 8-bit latches serially arranged to produce said parallel PCM data in said time slots.

35. The apparatus of claim 34, wherein said data memory comprises a 512-byte read-only-memory.

36. The apparatus of claim 35, wherein said connection memory comprises a 512-word read-only-memory.

37. An apparatus for combining both time switching and conference calling functions in a private exchange system, comprising:

first converter means for converting serial mode channel data from a plurality of incoming highways into parallel mode channel data, and for multiplexing the parallel mode channel data in time division to form multiplexed data in time slots within a frame;

a data memory having a plurality of memory locations for storing the multiplexed data in groups of said time slots received from said first converter means during a write operation, and for supplying stored multiplexed data in groups of said time slots during a read operation;

an address counter for generating a write address during said write operation for storing the multiplexed data in groups of said time slots in said data memory;

a control memory for storing control information to read and select stored multiplexed data during said read operation;

a conference calling unit coupled to receive the stored multiplexed data in groups of said time slots from said data memory for establishing conference connections during respective time slots;

a controller comprising a multiplexer connected between said control memory, said data memory and said conference calling unit for controlling data transfer between said data memory and said conference calling unit; and second converter means comprising a demultiplexer connected to an output of said conference calling unit for demultiplexing the output of said conference calling unit to form parallel output data, and for converting the parallel output data into serial output data for provision to a plurality of outgoing highways.

* * * * *